United States Patent Office
3,461,765
Patented Aug. 19, 1969

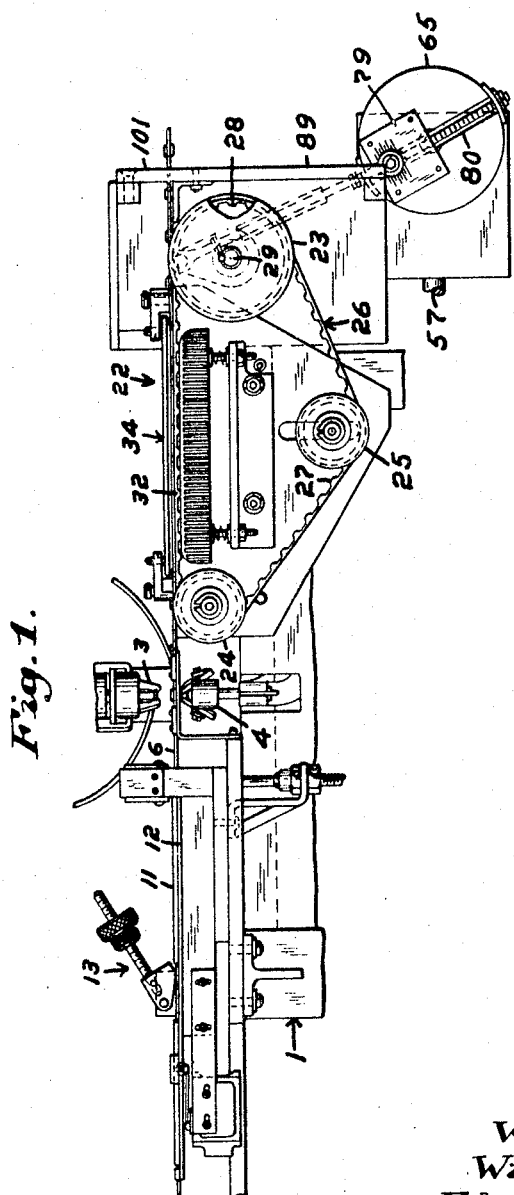

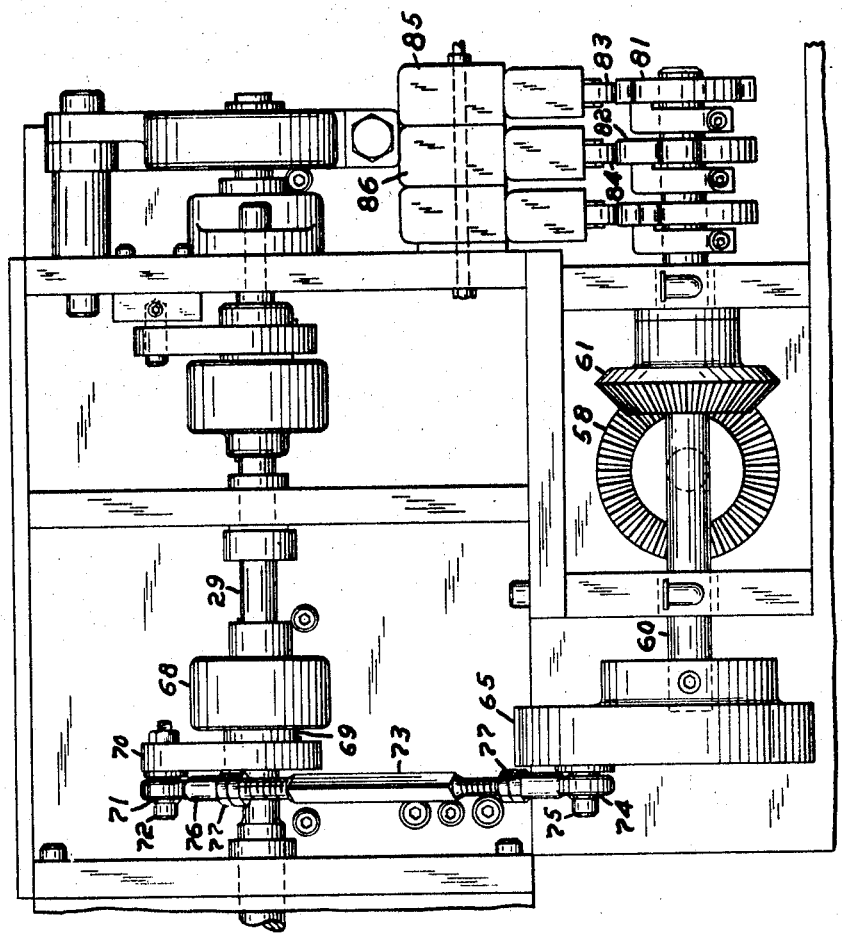

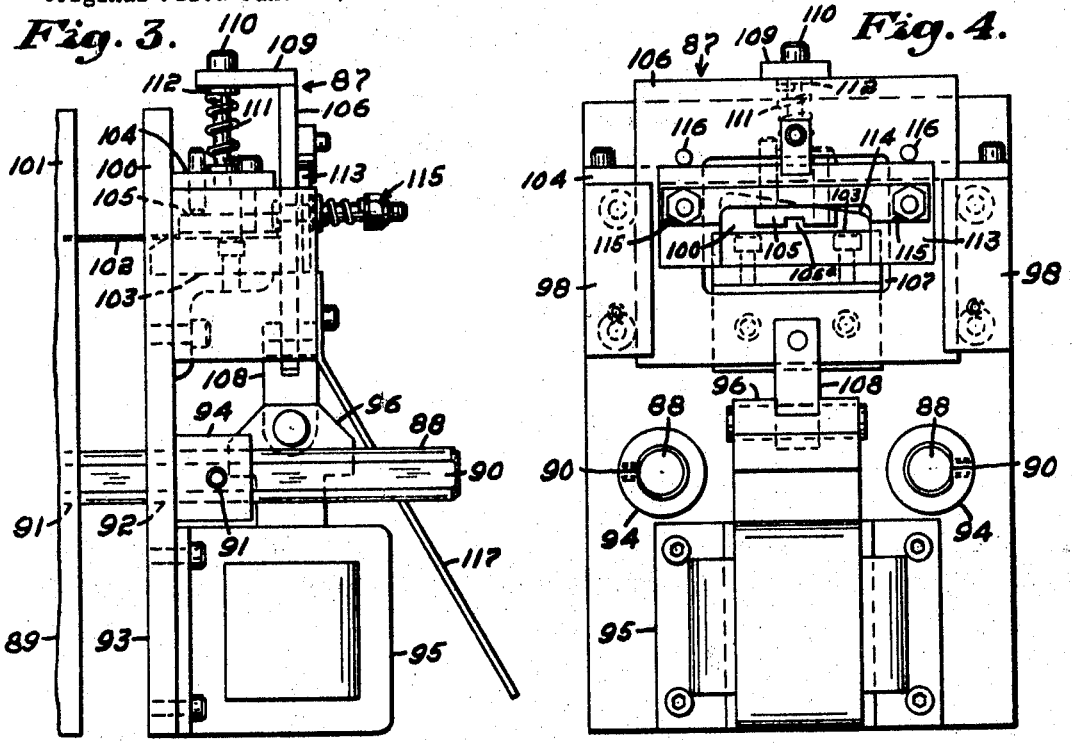

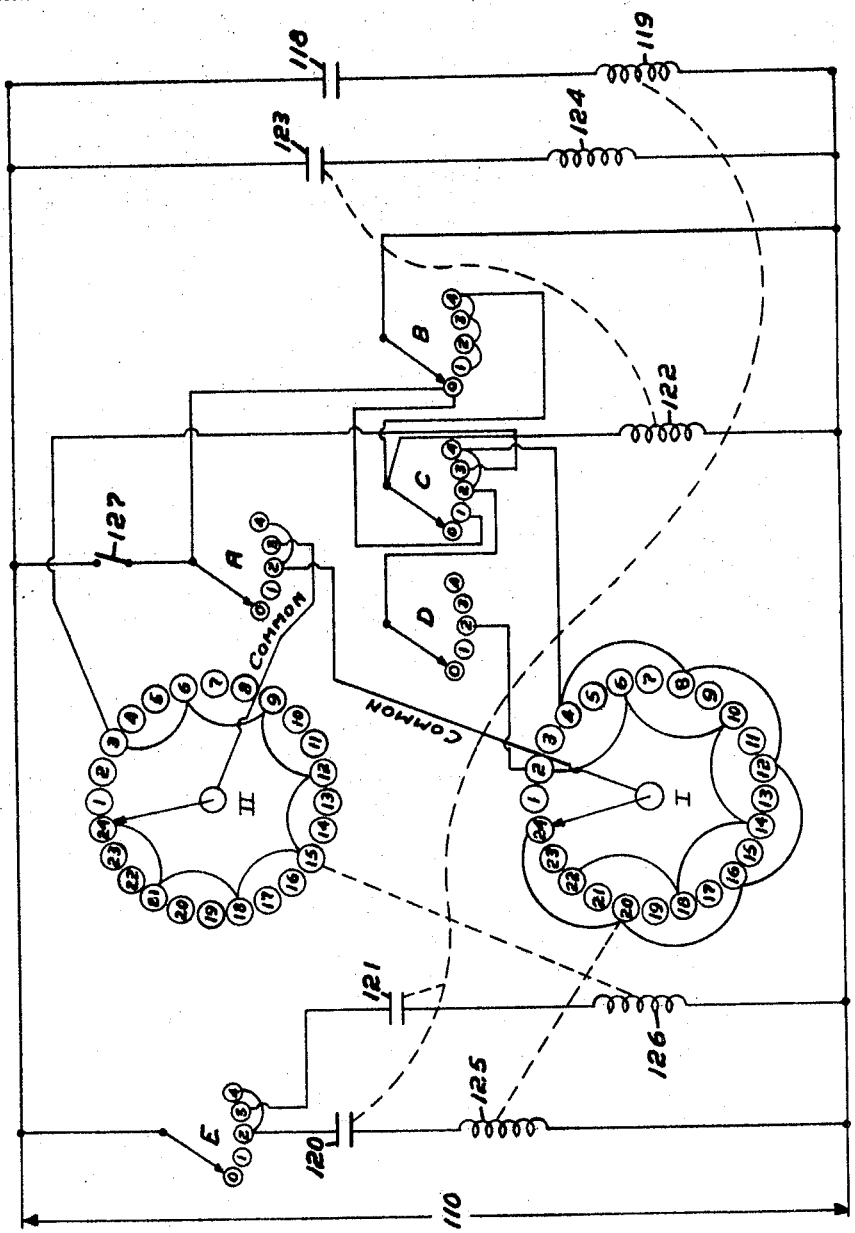

3,461,765
AUTOMATIC CUTTING MECHANISM
Walter S. Bachman, Jr., South Acton, William A. Erhardt, Jr., Cambridge, and Edward V. Surprenant, North Tewksbury, Mass., assignors, by mesne assignments, to United-Carr Incorporated, Boston, Mass., a corporation of Delaware
Original application Jan. 25, 1965, Ser. No. 427,882, now Patent No. 3,331,544, dated July 18, 1967. Divided and this application May 24, 1967, Ser. No. 640,902
Int. Cl. B26d 5/20
U.S. Cl. 83—234                          2 Claims

ABSTRACT OF THE DISCLOSURE

An electrically actuated and controlled work cutting device for use in connection with an automatic attaching machine for applying fastener components to the work at spaced intervals and a work moving mechanism which automatically advances the work a predetermined distance after each fastener attachment. The actuation of the cutting device is synchronized with the means that drive the work moving mechanism and the controlling circuitry includes variable set switch means through which the device is programmed to cut the work at intervals determined by the number of fastener components desired on a given length thereof.

Cross reference to related applications

This application is a division of our copending application Serial No. 427,882, filed Jan. 25, 1965, now U.S. Patent No. 3,331,544, issued July 18, 1967.

Background of the invention

The invention lies generally in the field of automatically operable cutter mechanisms and more particularly a device of that type which is adapted to be employed in connection with a machine which attaches fastener components to a tape, which machine is equipped with an automatic tape indexing mechanism for advancing the tape a predetermined distance subsequent to each fastener attachment.

Heretofore it has been known to attach fasteners to a continuous length of tape and thereafter manually cut selected lengths having a desired number of fasteners thereon prior to sewing or otherwise securing the tape to a garment or other article wherein the fasteners act as a closure. It has also been known to employ semi-automatic cutting devices either separate from the fastener attaching equipment or mounted directly thereon but in either case requiring the presence of an operator who must count the number of fasteners desired on the cut strip, place the tape in the cutting tool in the appropriate location and manually activate the cutter drive mechanism.

The present invention is fully automatic. It is mounted directly on the fastener attaching and tape indexing machine. It can be programmed to in effect count the number of fasteners desired on each length of tape. The electromechanical apparatus which performs the counting function and activates the knife is synchronized with the drive shaft of the tape indexing mechanism. The knife assembly per se is a compact unit which is readily installed on and removed from the fastener attaching machine. Thus the invention is seen to represent a substantial improvement over the prior art methods and devices for performing a similar function.

Summary of the invention

Novelty is seen to reside in the combination of an attaching machine for selectively applying fastener components to tape at predetermined spaced intervals, a tape indexing mechanism which repetitiously advances the tape a given distance after each fastener setting and an automatic cutter mechanism which cuts tape lengths having a desired number of spaced fastener elements wherein a rotating shaft which makes a single revolution on each machine cycle and drives the tape indexing mechanism, has a counter cam and a cutter cam mounted thereon, each of which is positioned to close separate microswitches for a portion of each shaft revolution, the microswitches being electrically connected to a cutter programming and activating mechanism which includes a wafer programming switch, at least one stepping relay and a solenoid whereby revolution of the shaft causes the counter cam to close one of the microswitches causing a pulsing of the stepping relay until a circuit is completed through the relay and wafer switch up to the other microswitch which in turn is closed by the cutter cam on the latter portion of each shaft revolution thereby energizing the solenoid and actuating the cutter knife.

Further appreciation of the novel aspects of the above recited combination will be had from a reading of the detailed description which follows in conjunction with a viewing of the accompanying drawing.

Brief description of the drawing

FIG. 1 is a fragmentary front elevational view of an automatic fastener attaching machine and tape indexing mechanism;

FIG. 2 is an enlarged, fragmentary end elevational view of the machine and indexing mechanism as seen from the right of FIG. 1;

FIG. 3 is a front elevational view of the cutter mechanism as it is mounted at the right end of the apparatus shown in FIG. 1;

FIG. 4 is an end elevational view of the cutter mechanism as seen from the right of FIG. 3;

FIG. 5 is a top plan view of the cutter mechanism; and

FIG. 6 is a schematic diagram of the cutter mechanism programming and actuating circuitry.

Description of the preferred embodiment

Referring to the drawing figures in detail, the reference numeral 1 designates the supporting structure of an automatic fastener attaching machine, which supporting structure extends to and rests on the floor. A conventional type of fastener combination attaching mechanism includes punch and die parts 3 and 4, respectively, which come together for the attachment of the two parts of a fastener combination, such as a stud and eyelet or a ring and socket together with the work, which is a tape of fabric or other material 6, therebetween, thus attaching the fastener combination to the tape. The punch and die parts then separate and the associated jaws receive their fastener parts from feeding means not visible in the drawing, such punch and die parts then coming together again for another attaching operation when the tape 6 has moved to a new location and stopped.

The tape 6 comes from a reel (not shown) at the left of the attaching machine as viewed in FIG. 1 moving along the combination tape support and guide means 11 of the usual type before passing between the punch and die parts 3 and 4, respectively. Since the tape is subject to stretching, special means 13 is provided to achieve an unchanging or constant drag on the work together with the portion of the flat work supporting plate 12 of the means 11 thereunder as the work is being pulled across in front of the attaching machine and between the punch and die parts thereof by the work moving mechanism generally designated 22.

The work moving mechanism 22 comprises a drive pulley 23 and two idler pulleys 24 and 25 over which a timing-type endless rubber belt 26 passes having teeth 27 in engagement with teeth of the pulleys, as 28 in pulley 23, located around the periphery of the three pulleys. The idler pulley 25 is adjustable up and down for mounting the belt on the pulleys and for adjusting the belt to the desired tension. The drive pulley 23 is mounted on a drive shaft 29 which is rotatable intermittently in a clockwise direction as seen in FIG. 1. The successive movements of this shaft, when so intermittently operating, are virtually equal angular amounts, the successive time intervals between these movements also being virtually equal to each other. The drive means for this manner of shaft operation which is transmitted to the belt 26 through the drive pulley 23 which is positioned to pull rather than push the belt and with it the tape through the portion of the mechanism 22 between the pulleys 23 and 24 will be covered subsequently.

The tape 6 passes on top of and along with the upper, horizontal, long reach 32 of the belt 26 beneath the tape holding means 34 moving to the right as seen in FIG. 1.

The drive portion of the mechanism 22 will now be covered. Power comes into the mechanism by way of a shaft 57 which is operatively connected to or is a part of the drive mechanism for operating the automatic fastener attaching machine upon which shaft 57 is mounted a mitre gear 58 both of which turn in a counterclockwise direction as seen in FIG. 2. The mechanism 22 includes a horizontally, transversely disposed shaft 60, suitably supported by bearings, upon which is mounted a mitre gear 61 for rotational movement by the gear 58 in a clockwise direction as it would be seen in FIG. 1 if shown. An end crank 65 of conventional form is mounted on the forward end of said shaft 60.

The shaft 29 is mounted parallel to shaft 60 and above and forwardly thereof as seen in FIG. 1. A one-way, right hand slip clutch 68 is mounted on shaft 29 by keying. A crank arm 70 is mounted by means of a key on the hub 69 of the outer part of the clutch 68. A rod end 71 is nonrotatably secured to the outer end of the crank arm 70 by means of a cap screw 72 and nut to which rod end the crank connecting rod 73 is rotatably connected. The lower end of this connecting rod is rotatably connected to the end crank 65 by means of a rod end 74 and cap screw 75. The connecting rod or link 73, which comprises a pair of internally threaded ends 76 and a connecting rod per se threaded at each end for reception within the ends 76 and a pair of lock nuts 77 can, of course, be adjusted for length in the well-known manner. The position of the lower rod end 74 and its cap screw can also be adjusted toward the center and away therefrom of the end crank 65, which is the center of the shaft 60, within the slot 80 of the end crank also in the well-known manner, which adjustment adjusts the amount of rotational turning of the shaft 29 through the crank arm 70 and one-way clutch 68. A scale 79 on the end crank is calibrated to produce different desired lengths of movements of the belt 26 together with the tape 6 held thereon to produce the desired predetermined spacing of the fastener combinations on the tape.

As shown in FIG. 2 the right hand end of the shaft 60 has a series of cams mounted thereon. For purposes of this disclosure cam 81 is designated as the counter cam and cam 82 as the cutter cam. The actuating node of the counter cam 81 extends over approximately 250° of its circumference and that of the cutter cam 82 over approximately 20° of its circumference. The cams 81 and 82 are positioned to engage the actuating arms 83 and 84 of microswitches 85 and 86, respectively, which are bracketed to the machine frame immediately above the cams. The arms 83 and 84 are in effect cam followers which when riding on the actuating nodes of the cams close the microswitch contacts.

Referring now to FIGS. 1 and 3 through 5, the reader will observe the knife assembly 87 which is adjustably mounted on a pair of solid posts 88 which extend outwardly in parallel from the end plate 89 of the machine frame. Each of the posts has a flat side 90 and each is press fitted into a circular recess 91 in the lower portion of the machine end plate 89. The posts pass through openings 92 in the lower portion of the cutter mounting plate 93 and thence through a pair of bushings 94 which are welded to the forward face of the mounting plate 93 in registration with the openings 92. A knife actuating relay and solenoid located within the casing 95 are bracketed to the extreme lower portion of the mounting plate 93 below the posts 88 and the solenoid plunger 96 extends upwardly between the posts. The mechanism can be laterally adjusted by releasing the set screws 97 in the bushings 94 which engage the flats 90 on the posts.

A pair of slide blocks 98 are bolted to the front face of the cutter mounting plate 93 and extend outwardly at right angles thereto adjacent the upper end thereof. The internal surfaces of the slide blocks at their ends remote from the mounting plate are provided with recesses 99 which extend vertically through the depth of the slide blocks for a purpose to be described later. The upper portion of the mounting plate 93 has a generally rectangular tape receiving opening 100 which is aligned with a similar opening 101 in the machine end plate 89. A thin, sheet metal tape conveyor 102 which is bracketed to the inside of the end plate 89 extends through the openings 100 and 101. A tape shear block 103 is bracketed to the mounting plate 93 between the slide blocks 98 such that its rear end is positioned in the opening 100 and lies on the lower edge of said opening. The forward end of the conveyor 102 which extends through the opening 100 rests on the top surface of the shear block 103. A knife assembly support bar 104 extends across and is bolted to the upper surfaces of the slide blocks 98 such that its rear edge abuts the front face of the mounting plate 93. A tape guide block 105 is bolted to the support bar 104 between the slide blocks 98 and in alignment with the opening 100. The guide block 105 has a width about one-half that of the shear block 103 and is positioned over the center of the shear block with its undersurface slightly spaced from the top surface of the shear block to allow the tape 6 to pass therebetween. The lower portion of the guide block has a fastener clearance slot 105a which extends through the length of the block as seen in FIG. 5.

A knife holder 106 which lies parallel to the mounting plate 93 is slidably seated in the recess 99 in the slide blocks 98 for vertical reciprocating movement with respect thereto. The knife holder has a relatively large, rectangular opening 107 and the forward end of the shear block 103 extends into this opening so that its extreme forward edge is approximately flush with the front face of the knife holder. At its lower end the knife holder 106 is connected through a bracket 108 to the solenoid plunger 96.

An angle plate 109 is welded perpendicularly to the upper edge of the knife holder 106 and extends rearwardly toward the mounting plate 93. The angle plate 109 has a central opening adjacent its rear edge through which extends a lag bolt 110 having its opposite end threaded into a tapped hole in the support bar 104. The portion of the lag bolt beneath the angle plate 109 is surrounded by a coiled compression spring 111 which bears through a washer 112 against the undersurface of the angle plate at one end and is seated in a shallow recess surrounding the tapped hole in the support bar 104 at its opposite end. A knife 113 having an inverted U shape and an angular cutting edge 114 is secured to the front face of the knife holder 106 such that the cutting edge extends across the opening 107. The knife is fastened to the knife holder by a bolt, washer, spring and nut combination generally designated 115 whereby the knife is spring biased against the front face of the knife holder. A pair of roll pins 116 extends out of the front face of the knife holder and rest on the upper edge of the knife to prevent any canting of the latter with respect to the former.

When the machine and tape indexing mechanisms are operating, the tape 6 with fasteners attached is automatically fed from the long reach 32 of the belt 26 through the opening 101 in the end plate 89, along the conveyor 102 and through the opening 100 in the mounting plate 93 onto the upper surface of the tape shear block 103 beneath the tape guide block 105 and thence through the opening 107 in the knife holder 106. When the solenoid plunger 96 pulls in, the knife holder slams downwardly in the recess 99 carrying the knife 113 with it and a length of tape is clipped off by the knife cutting edge 114 at the forward upper edge of the tape shear block 103. When the solenoid plunger 96 releases, the knife holder 106 is biased upwardly to its original position by the return coil spring 111. An angular trough 117 which is bolted to the forward faces of the side blocks 98 reecives the cut length of tape and carries it to a waiting receptacle (not shown).

The control circuitry for the programming and operation of the cutter mechanism will now be described with reference particularly to FIG. 6. The circuit components include contacts 118 of the 250° cam microswitch 85; relay coil 119 and its associated contacts 120 and 121; cutter relay coil 122, its associated contacts 123 and cutter solenoid 124; deck switch wafers A through E, each having fixed contact positions numbered 0 through 4 and a movable contact arm; stepping relays I and II each have twenty-four fixed contacts, a movable contact arm and energizing coils 125 and 126, respectively; and 20° cam microswitch contacts 127. The physical location of the microswitches has previously been described. Coil 122, contacts 123 and solenoid 124 are located in the casing 95. The remaining components are located in a control box (not shown) situated on the attaching machine proper. A cord and two-pronged plug connects the cutter relay and solenoid into the circuit through an outlet on the control box. Power is supplied to the circuit from the main power supply of the machine. A manually rotated dial (not shown) for simultaneous setting of the movable contact arms of wafers A through E at selected position 0 through 4 is located on the outside of the control box. With the dial set in the 0 position the cutter mechanism is in effect de-energized and tape with fasteners attached can be run continuously through the machine.

The cutter mechanism is programmed to cut tape lengths embodying from one to four fasteners as follows:

(1) With the wafer switch movable contact arms rotated to the #1 position.

During the initial portion of the rotation of shaft 60, the 250° cam microswitch contacts 118 are closed, coil 119 is energized, and its associated contacts 120 and 121 are closed. Relays 125 and 126 are not energized in that positions 1 and 3 of wafer E are open. However, the closing of the 20° cam microswitch contacts 127 after the 250° cam releases completes the circuit through the 0 position contact of wafer B and the #1 position contact of wafer C to the cutter relay 122 which closes contacts 123 thereby energizing the cutter solenoid 124 causing plunger 96 to pull in and the knife 113 to cut a strip of tape embodying a single fastener component. As soon as the 20° cam releases, relay 122 drops out and spring 111 returns the knife to its starting or up position and the sequence is repeated on the next revolution of shaft 60.

(2) With the deck wafers set to the #2 position.

On the first revolution of shaft 60 the closing of contacts 118 energizes coil 119 thereby closing contacts 120 through position 2 of wafer E which in turn energizes coil 125 causing a pulsing of the movable arm of stepping relay I from position 24 to position 1 which is an open. The subsequent closing of 20° contacts 127 on the first shaft revolution does not energize cutter relay 122 since the circuit is open at position 4 of wafer A and position 1 of wafer C. On the second revolution of shaft 60 the closing of the contacts 118 pulses stepping relay I to the #2 position. This sets up the circuit through position 2 of wafer D and position 2 of wafer C to the cutter relay, which circuit is completed when the 20° cam makes through position 2 of wafer A and the common lead of relay I. Thus the knife cuts a strip having two spaced fasteners.

(3) With the deck wafers set in the #3 position.

The closing of contacts 118 on the first revolution of shaft 60 energizes relay 119 and closes contacts 121 thereby energizing coil 126 through position 3 of wafer E and pulsing stepping relay II from position 24 to position 1 which is an open. Stepping relay I is not pulsed. The subsequent first revolution closing of contacts 127 fails to energize relay 122 since position 1 of wafer C is open. On the second shaft revolution stepping relay II is pulsed to the #2 position which is also open. On the third shaft revolution, stepping relay II is pulsed to the #3 position establishing the circuit through position 3 of wafer C to the cutter relay 122, which circuit is completed through position 3 through wafer A and the common lead of relay II when contacts 127 close and the knife cuts a strip embodying three spaced fasteners.

(4) With all deck wafers in the #4 position.

The closing of contacts 118 on the first shaft revolution pulses relay I from position 24 to position 1 which is an open and the subsequent closing of contacts 127 does not energize relay 122 since position 1 of wafer C is also open. On the second revolution of the shaft stepping relay I is pulsed to the #2 position which is connected to an open at position 2 of deck wafer D. On the third shaft revolution stepping relay #1 is pulsed to the #3 position which is open. On the fourth revolution stepping relay I pulses to the #4 position establishing the circuit through position 4 of wafer C to the cutter relay, which circuit is completed through positions 4, 2 of wafer A and the common lead of relay I when the 20° cam contacts 127 close. Thus, the cut tape strip embodies four spaced fastener components. The reader will realize that the jumping of every second contact of stepping relay I and every third contact of stepping relay II will result in the same sequence of operation as described above when the movable contact arms of those relays are pulsed to positions 5 through 24.

The foregoing description has set forth in detail the structure, control circuitry and operation of an automatic cutting mechanism for a fastener attaching and tape indexing machine which mechanism is programmed to cut lengths of tape embodying from one to four spaced fasteners when operating. However, it should be clearly understood that the mechanical structure of the knife assembly per se might be altered and the control circuitry programmed to instruct the knife to cut tape lengths having in excess of four fasteners without departing from the scope of the invention which is best defined by the following claims.

We claim:

1. In combination with a machine and a work moving mechanism for use in connection with said machine for repetitiously operating on a workpiece, said mechanism comprising endless belt-like means movable in predetermined fashion in coordination with the operation of the machine and means for holding the workpiece on the belt-like means so that the workpiece can be carried by such means in friction engagement therewith; a cutter mechanism the operation of which is synchronized with a rotating shaft which drives said work moving mechanism, said cutter mechanism including a knife assembly, a counter cam and a cutter cam mounted on said shaft and rotatable therewith, a pair of microswitches positioned to be engaged and operated by said cams, a programming, deck wafer switch, and at least one stepping relay whereby on partial rotation of said shaft said counter cam closes one of said microswitches which is electrically connected to said stepping relay through said wafer switch and on further rotation of said shaft said cutter cam closes the other of said microswitches which is electrically connected to means for actuating said knife assembly through said stepping relay and said wafer switch thereby establishing a closed circuit through which said knife assembly is instructed to cut the work according to a predetermined program controlled through said wafer switch.

2. In combination with an automatic attaching machine for applying fastener components to a tape at predetermined spaced intervals and a tape indexing mechanism which automatically advances the tape a given distance after each fastener attachment; an automatic cutter mechanism which severs tape lengths having a desired number of spaced fastener components thereon, the operation of said cutter mechanism being synchronized with a rotating shaft which drives said tape indexing mechanism which shaft makes a single revolution on each machine cycle, said cutter mechanism including a knife assembly, a counter cam and a cutter cam mounted on said shaft, said cams being positioned to close a pair of microswitches mounted on said machine, said microswitches being electrically connected to a cutter programming and actuating circuit including a variable set, programming wafer switch, a pair of stepping relays and a solenoid having a plunger mechanically connected to said knife assembly, whereby closing of one of said microswitches by said counter cam during a portion of said shaft's revolutions pulses one of said stepping relays until a circuit is partially established through said relay and said wafer switch which circuit is completed at the closing of the other microswitch by said cutter cam during the latter portion of said shaft's revolution thereby energizing said solenoid and actuating said knife assembly to cut a tape strip embodying a number of fastener components corresponding to the setting of said programming switch.

References Cited

UNITED STATES PATENTS

| | | | |
|---|---|---|---|
| 2,720,261 | 10/1955 | Koch | 83—234 X |
| 2,727,570 | 12/1955 | Hempel | 83—243 |
| 2,865,449 | 12/1958 | Frankenburg | 83—250 X |

ANDREW R. JUHASZ, Primary Examiner

U.S. Cl. X.R.

83—242, 244, 250, 422